(12) United States Patent
Ogata

(10) Patent No.: US 10,062,888 B2
(45) Date of Patent: Aug. 28, 2018

(54) POROUS MEMBRANE

(71) Applicant: Sumitomo Chemical Company, Limited, Tokyo (JP)

(72) Inventor: Toshihiko Ogata, Osaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/787,971

(22) PCT Filed: Jul. 2, 2015

(86) PCT No.: PCT/JP2015/069109
§ 371 (c)(1),
(2) Date: Oct. 29, 2015

(87) PCT Pub. No.: WO2016/017366
PCT Pub. Date: Feb. 4, 2016

(65) Prior Publication Data
US 2017/0149037 A1    May 25, 2017

(30) Foreign Application Priority Data
Jul. 29, 2014 (JP) .................................. 2014-153627

(51) Int. Cl.
*H01M 2/16* (2006.01)

(52) U.S. Cl.
CPC ......... *H01M 2/166* (2013.01); *H01M 2/1686* (2013.01)

(58) Field of Classification Search
CPC ............................. H01M 2/166; H01M 2/1686
See application file for complete search history.

(56) References Cited

U.S. PATENT DOCUMENTS

| | | | | |
|---|---|---|---|---|
| 7,745,050 B2* | 6/2010 | Kajita | ................. | H01M 2/1653 429/129 |
| 2007/0231700 A1* | 10/2007 | Watanabe | ............. | H01M 2/145 429/246 |
| 2008/0008932 A1 | 1/2008 | Kasamatsu | | |
| 2009/0092900 A1* | 4/2009 | Obana | ................... | H01M 2/166 429/223 |
| 2009/0148762 A1 | 6/2009 | Kasamatsu et al. | | |
| 2010/0178544 A1* | 7/2010 | Nishikawa | ......... | B01D 67/0011 429/129 |
| 2010/0221965 A1* | 9/2010 | Katayama | ................ | H01G 9/02 442/59 |
| 2010/0273048 A1* | 10/2010 | Machida | ............. | H01M 10/056 429/188 |
| 2010/0285348 A1 | 11/2010 | Murata et al. | | |
| 2011/0052962 A1 | 3/2011 | Suzuki et al. | | |
| 2011/0135982 A1* | 6/2011 | Muraoka | ................ | H01M 4/139 429/94 |
| 2011/0293976 A1* | 12/2011 | Chiba | ................. | H01M 2/1653 429/94 |
| 2011/0311856 A1* | 12/2011 | Matsui | .................. | H01M 2/166 429/145 |
| 2012/0115008 A1* | 5/2012 | Sano | .................... | H01M 2/1653 429/144 |
| 2012/0129034 A1 | 5/2012 | Hasegawa et al. | | |
| 2012/0141859 A1* | 6/2012 | Murata | ................. | B32L 327/32 429/144 |
| 2012/0328929 A1 | 12/2012 | Matsumoto et al. | | |
| 2013/0122354 A1 | 5/2013 | Sugimori et al. | | |
| 2013/0224552 A1* | 8/2013 | Hong | ................. | H01M 2/1686 429/144 |
| 2013/0330590 A1 | 12/2013 | Toyoda | | |
| 2014/0147726 A1 | 5/2014 | Toyoda | | |
| 2015/0056490 A1 | 2/2015 | Shimizu et al. | | |

FOREIGN PATENT DOCUMENTS

| | | |
|---|---|---|
| CN | 103000848 A | 3/2013 |
| JP | 2007227231 A | 9/2007 |
| JP | 2007273123 A | 10/2007 |
| JP | 2007280911 A | 10/2007 |
| JP | 2008016238 A | 1/2008 |
| JP | 2008186721 A | 8/2008 |
| JP | 2008/210791 A | 9/2008 |
| JP | 2008305662 A | 12/2008 |
| JP | 2010278018 A | 12/2010 |
| JP | 2011018590 A | 1/2011 |
| JP | 2011076748 A | 4/2011 |
| JP | 2011108443 A | 6/2011 |
| JP | 2013/145763 A | 7/2013 |
| JP | 2013168373 A | 8/2013 |
| JP | 2014056843 A | 3/2014 |
| JP | 5605591 B2 | 10/2014 |
| JP | 5835211 B2 | 12/2015 |
| KR | 1020080086437 A | 9/2008 |
| KR | 2014-0004156 A | 1/2014 |
| WO | 2011129169 A1 | 10/2011 |
| WO | 2012014616 A1 | 2/2012 |
| WO | 2012099149 A1 | 7/2012 |
| WO | 2012165624 A1 | 12/2012 |
| WO | 2013005796 A1 | 1/2013 |
| WO | 2013154090 A1 | 10/2013 |

OTHER PUBLICATIONS

Written Opinion dated Sep. 29, 2015 in International Application No. PCT/JP2015/069109.
Office Action dated Dec. 22, 2015 in JP Application No. 2014153627.

* cited by examiner

*Primary Examiner* — Gregg Cantelmo
(74) *Attorney, Agent, or Firm* — Panitch Schwarze Belisario & Nadel LLP

(57) ABSTRACT

A porous membrane is provided including a compound having a hydrophobic group and a nonionic hydrophilic group, an inorganic powder, and a binder resin.

15 Claims, No Drawings

POROUS MEMBRANE

CROSS-REFERENCE TO RELATED APPLICATION

This application is a Section 371 of International Application No. PCT/JP2015/069109, filed Jul. 2, 2015, not yet published, and the disclosure of which is incorporated herein by reference.

TECHNICAL FIELD

The present invention relates to a porous membrane.

BACKGROUND ART

Non-aqueous electrolyte secondary batteries such as a lithium ion secondary battery are widely used as batteries for use in personal computers, cellular phones, portable information terminals and so on.

In a non-aqueous electrolyte secondary battery, a separator is generally used as a member for separating a positive electrode and a negative electrode. Conventionally, a porous membrane formed of polyolefin have been used as a separator, there is a problem that heat resistance is not satisfactory.

As a separator that is excellent in heat resistance, for example, Patent Document 1 proposes a separator in which a porous membrane formed of inorganic powder and polyvinyl alcohol is laminated on a porous membrane formed of polyolefin.

PRIOR ART DOCUMENTS

Patent Documents

Patent Document 1: JP-A-2008-186721

SUMMARY OF THE INVENTION

Problems to be Solved by the Invention

However, the separator in which a porous membrane containing inorganic powder is laminated on a porous membrane formed of polyolefin faces the problem that it is susceptible to curling, and the workability during battery assembling deteriorates.

Means for Solving the Problems

The present invention includes the following aspects.
[1] A porous membrane comprising a compound having a hydrophobic group and a nonionic hydrophilic group, an inorganic powder, and a binder resin.
[2] The porous membrane according to [1], wherein the compound having a hydrophobic group and a nonionic hydrophilic group is a nonionic surfactant.
[3] The porous membrane according to [1] or [2], wherein the inorganic powder is a metal oxide, a meal hydroxide, or a metal carbonate.
[4] The porous membrane according to any one of [1] to [3], wherein the nonionic hydrophilic group has a polyoxyethylene structure.
[5] The porous membrane according to any one of [1] to [4], wherein the binder resin is a water-soluble resin.
[6] A laminated porous film comprising the porous membrane according to any one of [1] to [5] and another porous membrane that is different from the porous membrane according to any one of [1] to [5], wherein these are laminated.
[7] A coating liquid comprising a compound having a hydrophobic group and a nonionic hydrophilic group, an inorganic powder, a binder resin, and a solvent.
[8] A non-aqueous electrolyte secondary battery separator comprising the porous membrane according to any one of [1] to [5].
[9] A non-aqueous electrolyte secondary battery comprising the non-aqueous electrolyte secondary battery separator according to [8].
[10] A non-aqueous electrolyte secondary battery separator comprising the laminated porous film according to [6].
[11] A non-aqueous electrolyte secondary battery comprising the non-aqueous electrolyte secondary battery separator according to [10].

Effect of the Invention

According to the present invention, it is possible to obtain a laminated porous film that is insusceptible to curling, in which a porous membrane formed of polyolefin, and a porous membrane containing inorganic powder are laminated.

MODE FOR CARRYING OUT THE INVENTION

<Present Porous Membrane>

The porous membrane of the present invention (hereinafter also referred to as the present porous membrane) has interconnected fine pores inside. Since the present porous membrane is porous, gas, liquid, ions and so on can permeate from one side to the other side. Also, since the present porous membrane contains inorganic powder, it has high heat resistance and can impart shape stability at high temperatures to the laminated porous film comprising the present porous membrane. Therefore, the present porous membrane is preferably comprised in a non-aqueous electrolyte battery separator.

Further, by comprising a compound having a hydrophobic group and a nonionic hydrophilic group (hereinafter also referred to as a present compound), the present porous membrane can prevent curling that occurs in a laminated porous film comprising the present porous membrane.

Since the porous membrane formed of polyolefin and the porous membrane comprising an inorganic powder have different polarities, they are different in affinity with water, and can be different in amount of water absorption when they are put under the same environment. Therefore, in the laminated porous film in which a porous membrane formed of polyolefin and a porous membrane comprising an inorganic powder are laminated, difference arises in dimensional variation in each membrane, and curling occurs when the porous membrane formed of polyolefin and the porous membrane comprising an inorganic powder absorb water.

Since the inorganic powder generally has high polarity, it strongly interacts with water. It is assumed that interaction between such an inorganic powder and a nonionic hydrophilic group possessed by the present compound causes adhesion of the present compound to the surface of the inorganic powder, and by covering the surface of the inorganic powder with a hydrophobic group possessed by the present compound, interaction between the inorganic powder and water can be reduced. Accordingly, it is possible to reduce the moisture content of the present porous membrane, and curling is suppressed because the moisture content is approximate to that of the porous membrane formed of polyolefin.

The moisture content of the present porous membrane is preferably less than 0.15% by mass. When the moisture content of the porous membrane is less than 0.15% by mass, the curling amount tends to be further reduced, and the charge-discharge cycle characteristic of the non-aqueous electrolyte secondary battery comprising the present porous membrane tends to increase.

<Compound having Hydrophobic Group and Nonionic Hydrophilic Group>

As the nonionic hydrophilic group, groups having a polyoxyethylene structure, and a hydroxyl group can be recited. Also, the present compound preferably lacks an ionic group such as an anionic group and a cationic group. The anionic group used herein refers to salts such as sulfonates and carboxylates, and acid groups having a pKa of less than 10, e.g., sulfonic acid and carboxylic acid. That is, general hydroxyl groups having a pKa of 10 or more are not anionic groups, but correspond to nonionic groups.

Examples of the hydrophobic group include a hydrocarbon group, a group containing a fluorocarbon group, and a group containing silicon, with a hydrocarbon group being preferred.

The hydrocarbon group is preferably a hydrocarbon group having 3 to 30 carbon atoms. Examples of the hydrocarbon group having 3 to 30 carbon atoms include a propyl group, an isopropyl group, a butyl group, an isobutyl group, a sec-butyl group, a t-butyl group, a pentyl group, an isopentyl group, a hexyl group, an isohexyl group, a heptyl group, an isoheptyl group, an octyl group, an isooctyl group, a nonyl group, an isononyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group (=eicosyl group), a henicosyl group (=heneicosyl group), a docosyl group, a tricosyl group, a tetracosyl group, a pentacosyl group, a hexacosyl group, a heptacosyl group, an octacosyl group, a nonacosyl group, a triacontyl group, a propenyl group, an allyl group, an isopropenyl group, a butenyl group, an isobutenyl group, a pentenyl group, a hexenyl group, a heptenyl group, an octenyl group, a nonenyl group, a decenyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group (=eicosenyl group), a henicosenyl group (=heneicosenyl group), a docosenyl group, a tricosenyl group, a tetracosenyl group, a pentacosenyl group, a hexacosenyl group, a heptacosenyl group, an octacosenyl group, a nonacosenyl group, a triacontenyl group, a propynyl group, a 2-propynyl group, an isopropynyl group, a butynyl group, an isobutynyl group, a pentynyl group, a hexynyl group, a heptynyl group, an octynyl group, a nonynyl group, a decynyl group, an undecenyl group, a dodecenyl group, a tridecenyl group, a tetradecenyl group, a pentadecenyl group, a hexadecenyl group, a heptadecenyl group, an octadecenyl group, a nonadecenyl group, an icosenyl group (=eicosenyl group), a henicosenyl group (=heneicosenyl group), a docosenyl group, a tricosenyl group, a tetracosenyl group, a pentacosenyl group, a hexacosenyl group, a heptacosenyl group, an octacosenyl group, a nonacosenyl group, and a triacontynyl group.

The group containing a fluorocarbon group is preferably a group containing a fluorocarbon group having 3 to 30 carbon atoms. As the group containing a fluorocarbon group having 3 to 30 carbon atoms, a group in which part or all of the hydrogen atoms on the hydrocarbon group have been substituted by fluorine atoms is recited and examples thereof include a perfluoropropyl group, an isoperfluoropropyl group, a perfluorobutyl group, an isoperfluorobutyl group, a sec-perfluorobutyl group, a t-perfluorobutyl group, a perfluoropentyl group, an isoperfluoropentyl group, a perfluorohexyl group, an isoperfluorohexyl group, a perfluoroheptyl group, an isoperfluoroheptyl group, a perfluorooctyl group, an isoperfluorooctyl group, a perfluorononyl group, an isoperfluorononyl group, a perfluorodecyl group, a perfluoroundecyl group, a perfluorododecyl group, a perfluorotridecyl group, a perfluorotetradecyl group, a perfluoropentadecyl group, a perfluorohexadecyl group, a perfluoroheptadecyl group, a perfluorooctadecyl group, a perfluorononadecyl group, a perfluoroicosyl group (=perfluoroeicosyl group), a perfluorohenicosyl group (=perfluoroheneicosyl group), a perfluorodocosyl group, a perfluorotricosyl group, a perfluorotetracosyl group, a perfluoropentacosyl group, a perfluorohexacosyl group, a perfluoroheptacosyl group, a perfluorooctacosyl group, a perfluorononacosyl group, a perfluorotriacontyl group, a perfluoropropenyl group, a perfluoroallyl group, a isoperfluoropropenyl group, a perfluorobutenyl group, an isoperfluorobutenyl group, a perfluoropentenyl group, a perfluorohexenyl group, a perfluoroheptenyl group, a perfluorooctenyl group, a perfluorononenyl group, a perfluorodecenyl group, a perfluoroundecenyl group, a perfluorododecenyl group, a perfluorotridecenyl group, a perfluorotetradecenyl group, a perfluoropentadecenyl group, a perfluorohexadecenyl group, a perfluoroheptadecenyl group, a perfluorooctadecenyl group, a perfluorononadecenyl group, a perfluoroicosenyl group (=perfluoroeicosenyl group), a perfluorohenicosenyl group (=perfluoroheneicosenyl group), a perfluorodocosenyl group, a perfluorotricosenyl group, a perfluorotetracosenyl group, a perfluoropentacosenyl group, a perfluorohexacosenyl group, a perfluoroheptacosenyl group, a perfluorooctacosenyl group, a perfluorononacosenyl group, a perfluorotriacontenyl group, a perfluoropropynyl group, a 2-perfluoropropynyl group, an isoperfluoropropynyl group, a perfluorobutynyl group, an isoperfluorobutynyl group, a perfluoropentynyl group, a perfluorohexynyl group, a perfluoroheptynyl group, a perfluorooctynyl group, a perfluorononynyl group, a perfluorodecenyl group, a perfluoroundecenyl group, perfluorododecenyl group, a tridecenyl group, a tetradecenyl group, a pentadecenyl group, a hexadecenyl group, a heptadecenyl group, a perfluorooctadecenyl group, a perfluorononadecenyl group, a perfluoroicosenyl group (=perfluoroeicosenyl group), perfluorohenicosenyl group (=perfluoroheneicosenyl group), a perfluorodocosenyl group, a perfluorotricosenyl group, a perfluorotetracosenyl group, a perfluoropentacosenyl group, a perfluorohexacosenyl group, a perfluoroheptacosenyl group, a perfluorooctacosenyl group, a perfluorononacosenyl group, and a perfluorotriacontanyl group.

The hydrocarbon group and the group containing a fluorocarbon group may be coupled with an ether linkage, a thioether linkage, an ester linkage, an amide linkage, or the like.

Examples of the group containing silicon include an alkylsilyl group, a dialkylsilyl group, a trialkylsilyl group, an alkyl siloxane, a dialkyl siloxane, and a trialkyl siloxane.

The present compound is preferably a nonionic surfactant.

Examples of the present compound include polyethylene glycol-polypropylene glycol block copolymers such as polyethylene glycol-polypropylene glycol diblock copolymer, and polypropylene glycol-polyethylene glycol-polypropylene glycol triblock copolymer; compounds having a polyoxyethylene structure, e.g., polyoxyethylene alkyl ether, polyoxyethylene alkylphenyl ether, polyethylene glycol fatty acid ester, polyoxyethylene oxide polypropylene oxide block copolymer, polyoxyethylene fatty acid amide, and ethylene oxide-propylene oxide copolymer; and sorbitan derivatives such as polyoxyethylene sorbitan fatty acid ester. Polyoxyethylenealkyl ethers are preferred.

Examples of the polyoxyethylene alkyl ether include polyoxyethylene methyl ether, polyoxyethylene ethyl ether, polyoxyethylene propyl ether, polyoxyethylene isopropyl ether, polyoxyethylene butyl ether, polyoxyethylene isobutyl ether, polyoxyethylene sec-butyl ether, polyoxyethylene-t-butyl ether, polyoxyethylene pentyl ether, polyoxyethylene isopentyl ether, polyoxyethylene hexyl ether, polyoxyethylene isohexyl ether, polyoxyethylene heptyl ether, polyoxyethylene isoheptyl ether, polyoxyethylene octyl ether, polyoxyethylene isooctyl ether, polyoxyethylene nonyl ether, polyoxyethylene isononyl ether, polyoxyethylene decyl ether, polyoxyethylene undecyl ether, polyoxyethylene dodecyl ether, polyoxyethylene tridecyl ether, polyoxyethylene tetradecyl ether, polyoxyethylene pentadecyl ether, polyoxyethylene hexadecyl ether, polyoxyethylene heptadecyl ether, polyoxyethylene octadecyl ether, polyoxyethylene nonadecyl ether, polyoxyethylene icosyl ether (=polyoxyethylene eicosyl ether), polyoxyethylene henicosyl ether (=polyoxyethylene heneicosyl ether), polyoxyethylene docosyl ether, polyoxyethylene tricosyl ether, polyoxyethylene tetracosyl ether, polyoxyethylene pentacosyl ether, polyoxyethylene hexacosyl ether, polyoxyethylene heptacosyl ether, polyoxyethylene octacosyl ether, polyoxyethylene nonacosyl ether, and polyoxyethylene triacontyl ether.

The present compound is easily available on the market. Examples of commercially available products include "EMULGEN (registered trademark, available from Kao Corporation)", "Newcol (available from Nippon Nyukazai Co., Ltd.)", "LEOX (registered trademark, available from Lion Corporation)", "LEOCOL (registered trademark, available from Lion Corporation)", "LIONOL (registered trademark, available from Lion Corporation)", "LEOSOLB (registered trademark, available from Lion Corporation)", "LAOL (registered trademark, available from Lion Corporation)", "EMULMIN (registered trademark, available from Sanyo Chemical Industries, Ltd.)", "SANNONIC (registered trademark, available from Sanyo Chemical Industries, Ltd.)" "NEWPOL (registered trademark, available from Sanyo Chemical Industries, Ltd.)", and "SANMORIN (registered trademark, available from Sanyo Chemical Industries, Ltd.)".

The content of the present compound is preferably 0.05 to 10 parts by mass with respect to 100 parts by mass of the inorganic powder. It is preferably 0.1 parts by mass or more, more preferably 0.2 parts by mass or more, further preferably 0.3 parts by mass or more. Also, it is preferably 5 parts by mass or less, more preferably 3 parts by mass or less, further preferably 1.5 parts by mass or less.

When the content of the present compound exceeds 10 parts by mass with respect to 100 parts by mass of the inorganic powder, heat resistance of the present porous membrane tends to be impaired.

<Inorganic Powder>

Examples of the inorganic powder include metal oxides, metal hydroxides, metal carbonates, metal nitrides, metal carbides, metal hydroxides, and sulfates of metal, and metal oxides, metal hydroxides, and metal carbonates are preferred, and metal oxides are more preferred.

The metal oxide may contain other metal components such as metal hydroxide and metal carbonate. The percentage of other metal component contained in the metal oxide is typically 30% by mass or less, preferably 20% by mass or less, more preferably 10% by mass or less, further preferably 5% by mass or less, particularly preferably 1% by mass or less, with respect to the total amount of metal oxide. Among metal oxides, alumina is preferred from the viewpoint of further improving the chemical stability, and the shape stability at high temperatures, and among these α-alumina is more preferred.

Concrete examples of the inorganic powder include calcium oxide, magnesium oxide, titanium oxide, alumina, aluminum hydroxide, magnesium hydroxide, calcium carbonate, magnesium carbonate, barium carbonate, calcium sulfate, magnesium sulfate, barium sulfate, talc, clay, kaolin, silica, hydrotalcite, diatom earth, mica, zeolite, and glass. These may be used singly or in combination of two or more kinds.

The percentage of the inorganic powder in the present porous membrane typically exceeds 50% by mass of the present porous membrane, and it is preferably 70% by mass or more, more preferably 90% by mass or more, further preferably 95% by mass or more. Also, it is preferably 99.5% by mass or less, more preferably 99% by mass or less, and further preferably 98% by mass or less.

<Binder Resin>

The binder resin binds inorganic powder, and also has the function of binding the present porous membrane, and a porous membrane other than the present porous membrane (hereinafter, also referred to as other porous membrane). The binder resin is preferably a resin that is insoluble to an electrolyte solution of a non-aqueous electrolyte secondary battery, and is electrochemically stable within the use range of the non-aqueous electrolyte secondary battery. Examples of the binder resin include polyolefins such as polyethylene and polypropylene; fluorine-containing resins such as poly(vinylidene fluoride) and polytetrafluoroethylene; fluorine-containing rubbers such as vinylidene fluoride-hexafluoropropylene-tetrafluoroethylene copolymer and ethylene-tetrafluoroethylene copolymer; styrene-butadiene copolymer and hydride thereof; (meth)acrylate ester copolymers such as methacrylate ester copolymer, acrylonitrile-acrylate ester copolymer, and styrene-acrylate ester copolymer; rubbers such as ethylene-propylene rubber; polyvinyl acetate; resins having a melting point or a glass transition temperature of 180° C. or higher such as polyphenylene ether, polysulfone, polyether sulfone, poly phenylene sulfide, polyether-imide, polyamide, polyimide, polyamide-imide, polyether amide, polyester, aromatic polyester, and polyetherether ketone; polycarbonate; polyacetal; and copolymers of water-soluble resins such as carboxyalkyl cellulose, alkyl cellulose, hydroxyalkyl cellulose, starch, polyvinyl alcohol, sodium alginate, polyethylene glycol, cellulose ether, polyacrylic acid, polyacrylamide, and polymethacrylic acid. Among these, fluorine-containing resins, fluorine-containing rubbers, resins having a melting point or a glass transition temperature of 180° C. or higher and water-soluble resins are preferred. Fluorine-containing resins, fluorine-containing rubbers, resins having a melting point or a glass transition temperature of 180° C. or higher are preferred because they are highly stable in the use range of the nonaqueous electrolyte battery. Water-soluble resins are preferred in terms of the process and the environmental load. Among the water-soluble resins, carboxyalkyl cellulose, alkyl cellulose, hydroxyalkyl cellulose, starch, polyvinyl alcohol, and sodium alginate are preferred, and cellulose ether is more preferred. These binder resins maybe used singly or in combination of two or more kinds.

Examples of cellulose ether include carboxymethyl cellulose (CMC), hydroxyethyl cellulose (HEC), carboxyethyl cellulose, methyl cellulose, ethyl cellulose, cyanethyl cellulose, and oxyethyl cellulose. Among these, CMC and HEC that are excellent in chemical and thermal stability are preferred, and CMC is more preferred.

Polyamide is preferably aromatic polyamide, particularly preferably para-directing aromatic polyamide (hereinafter, also referred to as "para-aramid").

Para-aramid is typically obtained by condensation polymerization of para-directing aromatic diamine and para-directing aromatic dicarboxylic halide, and is substantially composed of a repeating unit whose amide bond is bound at a para position or the like orientation position of the aromatic ring (for example, orientation position extending coaxially or parallel in the opposite direction such as 4,4'-biphenylene, 1,5-naphthalene, and 2,6-naphthalene). Examples of para-aramid include para-directing para-aramids and para-aramids having a structure corresponding to a para-directing para-aramid such as poly(paraphenylene terephthalamide), poly(para-benzamide), poly(4,4'-benzanilideterephthalamide), poly(paraphenylene-4,4'-biphenylenedicarboxylic amide), poly(paraphenylene-2,6-naphthalenedicarboxylic amide), poly(2-chloro-paraphenylene terephthalamide), and paraphenylene terephthalamide/2,6-dichloroparaphenylene terephthalamide copolymer.

Polyimide is preferably aromatic polyimide, more preferably wholly aromatic polyimide. Aromatic polyimide is typically produced by condensation polymerization of a dianhydride of an aromatic compound and a diamine. Examples of the dianhydride include pyromellitic dianhydride, 3,3',4,4'-diphenyl sulfone tetracarboxylic dianhydride, 3,3', 4,4'-benzphenone tetracarboxylic dianhydride, 2,2'-bis(3,4-dicarboxyphenyl)hexafluoropropane, and 3,3',4,4'-biphenyl tetracarboxylic dianhydride. Examples of the diamine include oxydianiline, paraphenylene diamine, benzphenonediamine, 3,3'-methylene dianiline, 3,3'-diaminobenzphenone, 3,3'-diaminodiphenylsulfone, and 1,5'-naphthalenediamine.

Polyamideimide is preferably aromatic polyamideimide. Aromatic polyamideimide is typically obtainable by condensation polymerization of an aromatic dicarboxylic acid and an aromatic diisocyanate, or may be obtained by condensation polymerization of an aromatic dianhydride and an aromatic diisocyanate. Examples of the aromatic dicarboxylic acid include isophthalic acid and terephthalic acid. Examples of the aromatic dianhydride include trimellitic anhydride. Examples of the aromatic diisocyanate include 4,4'-diphenylmethane diisocyanate, 2,4-tolylene diisocyanate, 2,6-tolylene diisocyanate, ortho-tolylane diisocyanate, and m-xylene diisocyanate.

The percentage of the inorganic powder in the total amount of the binder resin and the inorganic powder in the present porous membrane typically exceeds 50% by mass, preferably 70% by mass or more, more preferably 90% by mass or more, further preferably 95% by mass or more. Also it is preferably 99.5% by mass or less, more preferably 99% by mass or less, further preferably 98% by mass or less. When the percentage of the inorganic powder falls within the range specified above, the present porous membrane with excellent balance between ion permeability and unlikeliness of powder dropping is obtained. Powder dropping is a phenomenon that the inorganic powder peels off from the present porous membrane.

The present porous membrane may contain other ingredient as long as functions of the present porous membrane are not impaired. Examples of the other ingredient include a dispersing agent, a plasticizer, and a pH modifier.

The thickness of the present porous membrane is typically 0.1 to 20 μm, preferably 1 to 10 μm. When the thickness is less than 0.1 μm, heat resistance of the non-aqueous electrolyte secondary battery separator including the present porous membrane tends to be insufficient. For example, in the case of using a laminated porous film in which the present porous membrane and a porous membrane formed of polyolefin are laminated, as a non-aqueous electrolyte secondary battery separator, the separator can contract when the thickness of the present porous membrane is less than 0.1 μm because the separator cannot bear the thermal contraction of the porous membrane formed of polyolefin when heat generation occurs in the non-aqueous electrolyte secondary battery due to an accident or the like. On the other hand, when the thickness exceeds 20 μm, the thickness of the separator is large, and the capacity of the battery may be reduced.

The porosity of the present porous membrane is typically 20 to 80% by volume, preferably 30 to 70% by volume.

When the porosity is less than 20% by volume, the retaining amount of the electrolyte solution can decrease, whereas when the porosity is more than 80% by volume, the heat resistance of the present porous membrane may be impaired. In other words, there is a fear that the current cannot be blocked when the battery severely generates heat.

The pore diameter of pores possessed by the present porous membrane is preferably 3 μm or less, more preferably 1 μm or less from the view point of having excellent ion permeability and preventing entry of particles into the positive electrode or the negative electrode.

The permeability of the present porous membrane is typically represented by air permeability. Air permeability of the present porous membrane is typically 30 to 1000 sec/100 cc, preferably 50 to 800 sec/100 cc.

A mass per unit area of the present porous membrane is typically 4 to 20 $g/m^2$, preferably 5 to 12 $g/m^2$. When the mass per unit area is less than 4 $g/m^2$, the strength can be insufficient, whereas when it is more than 20 $g/m^2$, the thickness of the present porous membrane increases, and the capacity of the battery may be reduced.

<Laminated Porous Film>

The present porous membrane is used in the form of a laminated porous film in which it is laminated with another porous membrane (hereinafter also referred to as the present laminated porous film), as a non-aqueous electrolyte secondary battery separator. Examples of another porous membrane include paper of viscose rayon, natural cellulose or the like; mixed paper obtained by papering fibers such as cellulose, polyester or the like; electrolytic paper; kraft paper; Manila paper; polyethylene nonwoven fabric, polypropylene nonwoven fabric, polyester nonwoven fabric, glass fiber, porous polyolefin (e.g., porous polyethylene, porous polypropylene), porous polyester, aramid fiber, polybutylene terephthalate nonwoven fabric, para-wholly aromatic polyamide, poly(vinylidene fluoride), tetrafluoroethylene, copolymer of vinylidene fluoride and propylene hexafluoride, nonwoven fabric or porous membrane of fluorine-containing resin such as fluorine rubber or the like; and proton conductive polymer. A porous membrane formed of polyolefin (hereinafter, also referred to as polyolefin membrane) is preferred.

The present laminated porous film may have another porous membrane and a plurality of the present porous membranes, and for example, the present porous membranes may be laminated on both sides of another porous membrane. When the present porous membranes are laminated on both sides of another porous membrane, the present porous membranes may contain different present compounds, an inorganic powder and binder resins.

The polyolefin membrane imparts a function of shutdown to the present laminated porous film by melting to lose the pores when the battery severely generates heat. Further, since the present porous membrane has heat resistance at high temperatures where shutdown occurs, the present laminated porous film has shape stability even at high temperatures.

The moisture content of the present laminated porous membrane is preferably less than 0.15% by mass.

When the moisture content of the porous membrane is 0.15% by mass or more, the charge-discharge cycle characteristic of the battery may be impaired.

The 50% breakdown voltage of the non-aqueous electrolyte secondary battery that includes the present laminated porous film as a non-aqueous electrolyte secondary battery separator is preferably 4.40 V or more. The non-aqueous electrolyte secondary battery has a battery voltage of as large as 4.40 V, and even when the battery capacity is large, abnormal heat generation is suppressed at the time of occurrence of internal short-circuit, or in other words, it has excellent safety for internal short-circuit.

The membrane resistance of the laminated porous film is preferably 0.25 to 5.00 $\Omega \cdot cm^2$ from the view point of battery characteristics (ion permeability, load characteristic). When the membrane resistance is less than 0.25 $\Omega \cdot cm^2$, ion permeability is excellent; however, the risk of occurrence of micro short circuit can increase. When the membrane resistance exceeds 5.00 $\Omega \cdot cm^2$, excellent ion permeability is not obtained, and battery characteristics may be impaired. For increasing the membrane resistance, for example, the thickness of the polyolefin membrane and/or the present porous membrane can be increased, or the porosity thereof can be reduced. For reducing the membrane resistance, the thickness of the polyolefin membrane and/or the present porous membrane can be reduced, or the porosity thereof can be increased.

Thickness of the present laminated porous film is typically 5 to 75 µm, preferably 10 to 50 µm. When the thickness of the laminated porous film is less than 5 µm, the laminated porous film can be easily broken, whereas when it exceeds 75 µm, thickness of the present laminated porous film increases, and the capacity of the battery may be reduced.

The volume per unit area of the present porous membrane contained in the present laminated porous film is typically 0.5 to 20 cc/m², preferably 1 to 10 cc/m² from the view points of stability at the time of heating and battery characteristics. When the volume per unit area is less than 0.5 cc/m², the present laminated porous film can be easily broken under heating, whereas when it exceeds 20 cc/m², the thickness of the present laminated porous film increases and the capacity of the battery can be reduced. When the present porous membranes are laminated on both sides of another porous membrane, the volume per unit area is the total value of both sides.

Air permeability of the present laminated porous film is typically 50 to 2000 sec/100 cc, preferably 70 to 1000 sec/100 cc. When the air permeability exceeds 2000 sec/100 cc, the battery characteristics (ion permeability, load characteristic) may be impaired.

The present laminated porous film may contain porous layers such as an adhesive layer, a protective layer and so on other than another porous membrane and the present porous membrane as long as the object of the present invention is not impaired.

<Polyolefin Membrane>

Examples of the polyolefin contained in the polyolefin membrane include high molecular weight homopolymers or copolymers obtained by polymerizing ethylene, propylene, 1-butene, 4-methyl-1-pentene, 1-hexene or the like. High molecular weight polyethylene is preferred. These polyolefins may be used singly or in combination of two or more kinds.

The molecular weight of the polyolefin is preferably $1 \times 10^5$ to $15 \times 10^6$ by weight average molecular weight from the view point of preventing solution of the polyolefin membrane into the electrolyte solution when the present laminated porous film is used in a non-aqueous electrolyte secondary battery, as a non-aqueous electrolyte secondary battery separator.

The percentage of the polyolefin contained in the polyolefin membrane typically exceeds 50% by volume, preferably 70% by volume or more, more preferably 90% by volume or more, further preferably 95% by volume or more of the entire solids contained in the polyolefin membrane.

The polyolefin membrane may contain other ingredient than polyolefin as long as the function of the polyolefin membrane is not impaired.

The thickness of the polyolefin membrane is typically 4 to 50 µm, preferably 5 to 30 µm. When the thickness is less than 4 µm, the strength of the present laminated porous film can be insufficient, whereas when it is more than 50 µm, the thickness of the present laminated porous film increases, and the capacity of the battery can be reduced.

Porosity of the polyolefin membrane is typically 20 to 80% by volume, preferably 30 to 70% by volume.

When the porosity is less than 20% by volume, the retaining amount of the electrolyte solution can decrease, whereas when the porosity is more than 80% by volume, lost of pores at high temperatures where shutdown occurs can be insufficient, or in other words, there is a fear that the current cannot be blocked when the battery severely generates heat.

The pore diameter of pores possessed by the polyolefin membrane is preferably 3 µm or less, more preferably 1 µm or less from the view point of having excellent ion permeability and preventing entry of particles into the positive electrode or the negative electrode when the present laminated porous film is used as a non-aqueous electrolyte secondary battery separator.

The polyolefin membrane has interconnected pores inside, and allows permeation of gas, liquid, ions and so on from one side to the other side. The permeability is typically represented by air permeability. Air permeability of the polyolefin membrane is typically 30 to 1000 sec/100 cc, preferably 50 to 800 sec/100 cc.

The mass per unit area of the polyolefin membrane is typically 4 to 15 g/m², preferably 5 to 12 g/m². When the mass per unit area is less than 4 g/m², the strength of the present laminated porous film can be insufficient, whereas when it is more than 15 g/m², the thickness of the present laminated porous film increases, and the capacity of the battery can be reduced.

<Method for Producing Present Porous Membrane>

As a method for producing the present porous membrane, a method of applying a coating liquid containing the present compound, an inorganic powder, and a binder resin (hereinafter also referred to as the present coating liquid) to a base material to form the present porous membrane, and removing the base material to complete the membrane, and a method of applying the present coating liquid on a base material, dipping it in a solvent that mingles with the coating liquid but is not soluble in the binder resin, followed by drying to form a porous membrane, and thereafter removing the base material can be recited.

The present coating liquid typically contains a solvent that dissolves a binder resin. The present coating liquid may contain a pH modifier, a dispersing agent, a plasticizer, alcohol and the like as long as the object of the present invention is not impaired, and preferably contains alcohol.

Examples of the alcohol include methanol, ethanol, 1-propanol, isopropyl alcohol, 2-butanol, tert-butyl alcohol, 1-butanol, isobutyl alcohol, sec-butyl alcohol, t-butyl alcohol, pentyl alcohol, isopentyl alcohol, hexyl alcohol, isohexyl alcohol, heptyl alcohol, isoheptyl alcohol, octyl alcohol, isooctyl alcohol, octyl alcohol, isooctyl alcohol, nonyl alcohol, isononyl alcohol, decyl alcohol, ethylene glycol, propylene glycol, and butanediol.

The content of the alcohol in the present coating liquid is not particularly limited, and may be such an amount that the property of facilitating application to other porous membrane can be obtained. The content of the alcohol in the present coating liquid is preferably 1 to 1000 parts by mass, more preferably 2 to 500 parts by mass, further preferably 3 to 300 parts by mass, still more preferably 5 to 200 parts by mass based on 1 part by mass of the binder resin.

<Method for Producing Another Porous Membrane>

Another porous membrane may be produced by a known method or a commercially available product may be used.

<Method for Producing Polyolefin Membrane>

As the polyolefin membrane, those produced by forming fine holes by monoaxially or biaxially stretching a film or sheet formed of polyolefin can be used. As a method for producing the polyolefin membrane, for example, a method including forming a film by adding a plasticizer to thermoplastic resin and removing the plasticizer with an appropriate solvent as described in JP-A-7-29563 can be recited. For example, when the polyolefin membrane is formed of a polyolefin resin containing a high molecular weight polyethylene having a weight average molecular weight of more than 1000000, and a low molecular weight polyolefin having a weight average molecular weight of 10000 or less, it is preferably produced by the method including the following steps from the view point of the production cost.

(a) Kneading 100 parts by mass of a high molecular weight polyethylene, 5 to 200 parts by mass of a low molecular weight polyolefin, and 100 to 400 parts by mass of an inorganic filler such as calcium carbonate to obtain a polyolefin resin composition.
(b) Forming a sheet by using the polyolefin resin composition.
(c) Removing the inorganic filler from the sheet obtained in step (b).
(d) Stretching the sheet obtained in step (c) to obtain a polyolefin membrane.

<Method for Producing Present Laminated Porous Film>

As a method for laminating the present porous membrane and another porous membrane, a method of separately producing another porous membrane and the present porous membrane and then laminating them, and a method of applying the present coating liquid to another porous membrane to form the present porous membrane can be recited, and the latter method is preferred for its simplicity.

As the method of applying the present coating liquid to another porous membrane to form the present porous membrane, for example, the method including the following steps can be recited.

(a) Preparing a coating liquid in which inorganic powder is dispersed in a solution of the present compound and the binder resin dissolved in a solvent,
(b) Applying the coating liquid to another porous membrane to form a coating membrane,
(c) Depositing the binder resin from the coating membrane by solvent removal or dipping in a solvent that does not dissolve the binder resin, and drying as needed.

When the binder resin is an aromatic polyamide, as the solvent that dissolves the binder resin, polar amide solvents and polar urea solvents can be recited. Concrete examples include N,N-dimethylformamide, N,N-dimethylacetamide, N-methyl-2-pyrrolidone (NMP), and tetramethyl urea.

When the binder resin is a para-aramid, it is preferred to add a chloride of alkali metal or alkali earth metal for the purpose of improving the solubility of the para-aramid in the solvent. Concrete examples include lithium chloride and calcium chloride. The adding amount of the chloride is preferably in the range of 0.5 to 6.0 mol, more preferably in the range of 1.0 to 4.0 mol per 1.0 mol of amide groups in the para-amide. When the chloride is less than 0.5 mol, the solubility of the para-aramid can be insufficient, whereas the chloride exceeding 6.0 mol can be undesired because the solubility of the chloride into the solvent is exceeded. The percentage of the chloride in the total amount of the coating liquid is preferably in the range of 2 to 10% by mass. Generally, when the chloride of alkali metal or alkali earth metal is less than 2% by mass, the solubility of the para-aramid can be insufficient, and when it exceeds 10% by mass, the solubility of the chloride can be insufficient.

As the solvent that dissolves the binder resin when the binder resin is an aromatic polyimide, dimethyl sulfoxide, cresol, o-chlorophenol and the like, besides those exemplified as a solvent that dissolves an aromatic polyamide can be preferably used.

As the solvent that dissolves the binder resin when the binder resin is a water-soluble resin, water, alcohols such as methanol, ethanol and isopropanol, acetone, toluene, xylene, hexane, N-methylpyrrolidone, N, N-dimethylacetamide, and N,N-dimethylformamide can be used singly, or a plurality of these solvents can be mixed as far as they are compatible. Among these, from the view point of process and environmental loads, preferably, water occupies 80% by mass or more of the medium, and only water is more preferred.

When the solvent contains water, it is preferred that another porous membrane is subjected to a hydrophilization treatment before the solvent is applied on another porous member. By subjecting another porous membrane to the hydrophilization treatment, the coating properties are further improved, and a more uniform present porous membrane can be obtained. This hydrophilization treatment is effective particularly when the concentration of water in the solvent is high.

The hydrophilization treatment of another porous membrane may be conducted in any method, and concrete examples of the method include a treatment with a chemical such as acid or alkali, a corona treatment, and a plasma treatment.

Here, the corona treatment is advantageous in that the other porous membrane can be hydrophilized in a relatively short time, and reforming by corona discharge is limited to the surface and the vicinity of the other porous membrane, so that high coating properties can be ensured without causing change in the properties of the interior of the other porous membrane.

Removal of the solvent from the coating liquid applied on the other porous membrane is generally conducted by a method by drying. Also, the coating film before drying may be dipped in a solvent that does not dissolve the binding resin, to deposit the binder resin, and then the solvent may be removed by drying. When the coating liquid is applied on the other porous membrane, the drying temperature of the solvent is preferably such a temperature that does not change the air permeability of the other porous membrane after drying.

The method for applying the present coating liquid on another porous membrane is not particularly limited as far as uniform wet coating is possible, and a conventionally known method can be employed. For example, a capillary coating method, a spin coating method, a slit dye coating method, a spray coating method, a roll coating method, a screen printing method, a flexo printing method, a bar coater method, a gravure coater method, and a dye coater method can be employed. The thickness of the present porous membrane to be formed can be controlled by adjusting the applying amount of the present coating liquid, the concentration of the present coating liquid, and the content ratio between the inorganic powder and the binder resin. During the coating, a resin film, a metal belt, or a dram can be used as a support.

As the method for preparing the present coating liquid, a method of stirring by a mechanical stirring method, an ultrasonic dispersing method, a high pressure dispersing method, or a media dispersing method can be recited. The high pressure dispersing method is more preferred because it can disperse the inorganic powder more uniformly.

<Non-Aqueous Electrolyte Secondary Battery>

The non-aqueous electrolyte secondary battery includes a positive electrode, a negative electrode, a separator for a non-aqueous electrolyte secondary battery sandwiched between the opposing faces of the positive electrode and the negative electrode, and a non-aqueous electrolyte solution.

As the non-aqueous electrolyte solution, for example, a non-aqueous electrolyte solution prepared by dissolving a lithium salt in an organic solvent can be used. The lithium salt can be one or a mixture of two or more of $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salt, $LiAlCl_4$ and so on. Among these, those containing at least one selected from the group consisting of fluorine-containing $LiPF_6$, $LiAsF_6$, $LiSbF_6$, $LiBF_4$, $LiCF_3SO_3$, $LiN(CF_3SO_2)_2$, and $LiC(CF_3SO_2)_3$ are preferably used.

Examples of the non-aqueous electrolyte solution include carbonates such as propylene carbonate, ethylene carbonate, dimethyl carbonate, diethyl carbonate, ethylmethyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate, methyl acetate, and Y-butyrolactone; nitriles such as acetonitrile and butyronitrile; amides such as N, N-dimethylformamide, and N,N-dimethyacetamide; carbamates such as 3-methyl-2-oxazolidon; sulfur-containing compounds such as sulfolane, dimethylsulfoxide, and 1,3-propansultone or the foregoing substances into which a fluorine group is introduced, and typically a mixture of two or more kinds is used.

Among these, those containing carbonates are preferred, and mixtures of cyclic carbonate and non-cyclic carbonate, or mixtures of cyclic carbonate and ethers are more preferred. As the mixtures of cyclic carbonate and non-cyclic carbonate, mixtures containing ethylene carbonate, dimethyl carbonate and ethylmethyl carbonate are preferred in the points that they operate in a wide temperature range, and are refractory even when graphite materials such as natural graphite, artificial graphite and the like are used as an active material of the negative electrode.

As the positive electrode, a collector carrying a mixture of a positive-electrode active material, a conductive agent and a binder is used. A concrete example of the positive-electrode active material that can be used contains a material capable of being doped or undoped with lithium ions, contains a carbonaceous material as the conductive agent, and contains a thermoplastic resin as the binder. As the material capable of being doped or undoped with lithium ions, a lithium composite oxide containing at least one transition metal such as V, Mn, Fe, Co, and Ni can be recited. Among these, a lithium composite oxide having an α-$NaFeO_2$ structure such as lithium nickel oxide and lithium cobalt oxide, a lithium composite oxide having a spinel structure such as lithium manganese spinel are recited in the point that the average discharge potential is high.

The lithium composite oxide may contain various metal elements, and it is preferred to use a composite lithium nickel oxide containing at least one metal element in such an amount that the metal element is 0.1 to 20 mol %, based on the sum of the mol number of at least one metal element selected from the group consisting of Ti, V, Cr, Mn, Fe, Co, Cu, Ag, Mg, Al, Ga, In and Sn, and the mol number of Ni in the lithium nickel oxide, because cycle performance in use with high capacity is improved.

Examples of the binder include polyvinylidene fluoride, copolymer of vinylidene fluoride, polytetrafluoroethylene, tetrafluoroethylene-hexafluoropropylene copolymer, tetrafluoroethylene-perfluoroalkylvinyl ether copolymer, ethylene-tetrafluoroethylene copolymer, vinylidene fluoride-hexafluoropropylene-tetrafluoroethylene copolymer, and thermoplastic resins such as thermoplastic polyimide, polyethylene, and polypropylene.

As the conductive agent, carbonaceous materials such as natural graphite, artificial graphite, cokes, and carbon black can be recited. As the conductive agent, these may be solely used, or for example, a mixture of artificial graphite and carbon black may be used.

As the negative electrode, for example, materials capable of being doped or undoped with lithium ions, lithium metal, lithium alloy and so on can be used. Examples of the materials capable of being doped or undoped with lithium ions include carbonaceous materials such as natural graphite, artificial graphite, cokes, carbon black, pyrocarbons, carbon fiber, a sintered organic polymer compound, and chalcogen compounds of oxides, sulfides and the like doped or undoped with lithium ions at a potential lower than the positive electrode. As the carbonaceous material, carbonaceous materials based on graphite materials such as natural graphite and artificial graphite are referred in the point that they have high potential flatness, and low average discharge potential, and thus large energy density is obtained when combined with the positive electrode.

As the negative electrode collector, Cu, Ni, stainless or the like can be used, and Cu is preferred because it is unlikely to form an alloy with lithium, and can be easily worked into a thin film, particularly in the lithium secondary battery. As a method for making the negative electrode collector carry a mixture containing a negative electrode active material, a pressure forming method, or a method of preparing a paste by using a solvent or the like, and applying the paste on the collector, followed by drying and pressing to make them compression bonded can be recited.

The shape of the battery of the present invention is not particularly limited, and may be any of a paper shape, a coin shape, a cylindrical shape, a rectangular shape or a laminate shape.

EXAMPLES

In the following Examples, Comparative Examples, and Reference Examples, physical properties of a laminated porous film were measured according to the following methods.
(1) Measurement of Curling: A laminated porous film was cut into a square shape of 8 cm×8 cm, and after retention for a day under room temperature and a dew point −30° C., and a rising height in an end part was measured.

Also appearance was evaluated according to the following criteria. C indicates a completely curled state, and the states of A and B are preferred, and A is more preferred.
A: No rise in an end part.
B: Only an end part rises, but most of the part other than the end part does not rise, and keeps a flat state.
C: Both end parts come close to each other, and are curling in a cylindrical shape.
(2) Dimension Retention Rate: A laminated porous film was cut into a square shape of 5 cm×5 cm, and a marking line of a square shape of 4 cm square was described in the center, and the film was sandwiched between two sheets of paper, and retained at 150° C. in an oven for 1 hour, then the film was removed and the dimension of the square shape was measured, and dimension retention rate was calculated. The calculating method of dimension retention rate is as follows.
Length of marking line in the vertical direction (TD) before heating: W1
Length of marking line in the vertical direction (TD) after heating: W2
Dimension retention rate (%) in the vertical direction (TD) =W2/W1×100
(3) Air Permeability:
Measured according to JIS P8117.

Example 1

To a mixture of 100 parts by mass of alumina microparticles (trade name "AKP3000", available from Sumitomo Chemical Co., Ltd.), 3 parts by mass of carboxymethyl cellulose (Item number 1110, available from DAICEL FINECHEM LTD.), and 0.5 parts by mass of polyoxyethylene alkyl ether (available from Sanyo Chemical Industries, Ltd.; Sanmorin (registered trademark) 11), water was added so that the solid content was 29% by mass, and the obtained mixture was stirred and mixed twice in the condition of 2000 rpm, 30 seconds under room temperature by using a planetary centrifugal mixer "Awatori Rentaro" (registered trade name: available from Thinky Corporation). To the obtained mixture, 14 parts by mass of isopropyl alcohol was added, to obtain a coating liquid as an uniform slurry having a solid content of 28% by weight. The obtained coating liquid was applied on a porous membrane of polyethylene having subjected to a corona treatment 20 W/(m$^2$/min.) (thickness 12 μm, porosity 41%) by a doctor blade method, and the laminate which was the obtained coated matter was dried at 65° C. for 5 minutes to obtain a laminated porous film (1) in which the present porous membrane and the porous membrane formed of polyethylene are laminated. The mass per unit area of the present porous membrane in the laminated porous film (1) was 6.2 g/m$^2$. Physical properties of the laminated porous film (1) are shown in Table 1.

Example 2

A laminated porous film (2) was obtained in the same manner as in Example 1 except that the amount of polyoxyethylene alkyl ether of 0.5 parts by mass in Example 1 was varied to 1 part by mass. The mass per unit area of the present porous membrane in the laminated porous film (2) was 6.6 g/m$^2$. Physical properties of the laminated porous film (2) are shown in Table 1.

Comparative Example 1

A laminated porous film (3) was obtained in the same manner as in Example 1 except that 0.5 parts by mass of polyoxyethylene alkyl ether in Example 1 was not added. The mass per unit area of the present porous membrane in the laminated porous film (3) was 6.9 g/m$^2$. Physical properties of the laminated porous film (3) are shown in Table 1.

TABLE 1

| | Curling measurement | | Dimension retention rate (%) | Air permeability (sec/100 cc) |
|---|---|---|---|---|
| | Height of end part (cm) | Appearance | | |
| Example 1 | 0.5 | B | 100 | 244 |
| Example 2 | 0 | A | 98 | 254 |
| Comparative Example 1 | 1.5 | C | 100 | 233 |

The laminated porous films (1) and (2) obtained in Examples 1 and 2 could reduce the curling amount while keeping high dimension retention rate and air permeability.

INDUSTRIAL APPLICABILITY

According to the present invention, it is possible to obtain a hard-to-curl laminated porous film in which a porous membrane formed of polyolefin and a porous membrane containing inorganic powder are laminated.

The invention claimed is:

1. A non-aqueous electrolyte secondary battery separator comprising a laminated porous film comprising a first and a second porous membrane that are different from each other, wherein the first and the second porous membranes are laminated, and wherein the first porous membrane comprises a compound having a hydrophobic group and a nonionic hydrophilic group, an inorganic powder, and a binder resin,
    wherein a content of the inorganic powder is at least 50% by mass and 99% by mass or less based on 100% by mass of the first porous membrane,
    wherein the first porous membrane has a mass per unit area of 4 g/m$^2$ to 20 g/m$^2$,
    wherein the laminated porous film has a moisture content of less than 0.15% by mass and a membrane resistance of 0.25 Ω•cm$^2$ to 5.00 Ω•cm$^2$, and
    wherein the laminated porous film has a thickness of 5 μm to 75 μm and a volume per unit area of 0.5 cc/m$^2$ to 20 cc/m$^2$.
2. A non-aqueous electrolyte secondary battery comprising the non-aqueous electrolyte secondary battery separator according to claim 1.

3. The non-aqueous electrolyte secondary battery separator according to claim 1, wherein the compound having a hydrophobic group and a nonionic hydrophilic group is a nonionic surfactant.

4. The non-aqueous electrolyte secondary battery separator according to claim 1, wherein the inorganic powder is a metal oxide, a metal hydroxide, or a metal carbonate.

5. The non-aqueous electrolyte secondary battery separator according to claim 1, wherein the nonionic hydrophilic group has a polyoxyethylene structure.

6. The non-aqueous electrolyte secondary battery separator according to claim 1, wherein the binder resin is a water-soluble resin.

7. The non-aqueous electrolyte secondary battery separator according to claim 6, wherein the binder is a cellulose ether.

8. The non-aqueous electrolyte secondary battery separator according to claim 1, wherein the hydrophobic group is a hydrocarbon group.

9. The non-aqueous electrolyte secondary battery separator according to claim 1, wherein the first porous membrane has a moisture content of less than 0.15% by mass.

10. The non-aqueous electrolyte secondary battery separator according to claim 1, wherein a content of the compound having a hydrophobic group and a nonionic hydrophilic group in the first porous membrane is 0.05 to 10 parts by mass with respect to 100 parts by mass of the inorganic powder.

11. The non-aqueous electrolyte secondary battery separator according to claim 1, wherein the second porous membrane comprises a polyolefin.

12. The non-aqueous electrolyte secondary battery separator according to claim 1, wherein a thickness of the first porous membrane is 0.1 µm to 20 µm.

13. The non-aqueous electrolyte secondary battery separator according to claim 1, wherein the first porous membrane has a porosity of 20% by volume to 80% by volume.

14. The non-aqueous electrolyte secondary battery separator according to claim 1, wherein the first porous membrane has an air permeability of 30 sec/100 cc to 1000 sec/100 cc.

15. The non-aqueous electrolyte secondary battery separator according to claim 1, wherein the laminated porous film has an air permeability of 50 sec/100 cc to 2000 sec/100 cc.

* * * * *